United States Patent [19]
Cooper

[11] 3,802,269
[45] Apr. 9, 1974

[54] ROCK BIT MAXIMUM TEMPERATURE RECORDING APPARATUS

[75] Inventor: Thomas William Cooper, Mansfield, Tex.

[73] Assignee: Dresser Industries, Inc., Dallas, Tex.

[22] Filed: Apr. 26, 1972

[21] Appl. No.: 247,673

[52] U.S. Cl. .............................. 73/343 R, 73/356
[51] Int. Cl. ............................................. G01k 1/14
[58] Field of Search.......... 73/343 R, 358, 356, 154, 73/349

[56] References Cited
UNITED STATES PATENTS

| | | | |
|---|---|---|---|
| 2,633,025 | 3/1953 | Boice | 73/343 R |
| 3,260,112 | 7/1966 | Godbey et al. | 73/356 |
| 3,260,111 | 7/1966 | Godbey | 73/356 |
| 3,327,527 | 6/1967 | Arps | 73/154 |

*Primary Examiner*—Richard C. Queissr
*Assistant Examiner*—Denis E. Corr
*Attorney, Agent, or Firm*—Eddie E. Scott; John N. Hazelwood

[57] ABSTRACT

An apparatus for recording the maximum temperature of a rotary rock bit during the drilling of a well. A removable element in a three cone, jet type, rotary rock bit is replaced with a casing containing a means for recording the maximum temperature of the bit during the drilling operation. The maximum temperature recording means includes a multiplicity of individual temperature indicating means for providing a permanent change in indicia when subjected to a predetermined temperature. The multiplicity of individual temperature indicating means are selected so that said predetermined temperatures form a sequence over a preselected range. This temperature range is in general within the range of from 200° to 600° Fahrenheit.

1 Claim, 3 Drawing Figures

PATENTED APR 9 1974 3,802,269

ROCK BIT MAXIMUM TEMPERATURE RECORDING APPARATUS

BACKGROUND OF THE INVENTION

The present invention relates to the art of earth boring and, more particularly, to an apparatus for recording the maximum temperature of an earth boring bit during the drilling of a well.

With the advent of modern deep wells and the drilling of steam wells, it has become necessary to know the maximum temperature of an earth boring bit during the drilling operation. Since the bits are being operated under extremely elevated temperature conditions, serious consequences can result if the temperature is even just slightly higher than expected. It can also be appreciated that a substantial cost saving will result if the maximum temperature is lower than expected and less expensive equipment and materials can be employed. Accurate temperature information is also essential for proper drilling mud and cement engineering.

A temperature measuring apparatus that requires an electrical connection with the surface is undesirable in the drilling of a well. The electrical connection would hamper the drilling operation and would not be expected to withstand the abuses encountered during the drilling of a well. In order to obtain a proper temperature measurement, the temperature measuring apparatus must be positioned proximate the operational components of the earth boring bit and the temperature measuring apparatus must be able to measure and record the maximum temperature of the bit while the bit is actually drilling. The temperature measuring apparatus should form an integral part of a standard earth boring bit yet be easily connected to and removed from the bit.

BRIEF DESCRIPTION OF THE PRIOR ART

A thermal prospecting system is shown in U. S. Pat. No. 2,403,704 to L. W. Blau patented July 9, 1946. A thermometer is positioned in a hole in the earth's surface. The hole is filled in as nearly as possible with dirt and temperature readings are taken at various time intervals.

In U. S. Pat. No. 2,598,551 to G. Jackson, a temperature indicating unit is shown. The unit is adapted to be connected in the housing of a well survey instrument and includes an annular body having an axial bore extending therethrough, a dial member secured to the inner wall of the body and projecting into the bore, and a temperature responsive element having one end secured in the body and another end extending into the bore in overlying relation to the dial member.

In U. S. Pat. No. 2,213,802 to H. Hugel patented Sept. 3, 1940, a borehole temperature measuring device is shown. The device includes a plunger or piston movable by variations in volume of a working fluid acting against the action of a resilient member, and rotatable at the same time by a driving mechanism. The frictional force opposing movement of the temperature responsive displacement of said piston or plunger is minimized or reduced due to the continuous motion of said plunger.

An electronic system for monitoring drilling conditions relating to oil and gas wells is shown in U. S. Pat. No. 3,541,852 to J. H. Brown et al. patented Nov. 24, 1970. This system is self-contained within a skid or trailer mounted console. The system records information relating to drilling depth, time, penetration rate, hook load, rotary speed, pump strokes, gas chromatography, and such drilling mud information as weight in, weight out, viscosity, temperature and flow rates.

In U. S. Pat. No. 3,327,527 to J. J. Arps patented June 27, 1967, a temperature logging while drilling system is shown. This system provides a measurement of the thermal gradient across the drill bit and over a preselected length of the mud stream down stream of the drill bit. This system derives signals representing thermal conditions existing at the bottom of the borehole as it is being drilled and transmits such signals to the earth's surface.

A bore mining apparatus with strata sensing means is shown in U. S. Pat. No. 2,741,468 to P. L. Alspaugh patented Apr. 10, 1956. The apparatus includes means for sensing variations in temperature generated in a cutting tool as the cutter head advances and cuts into different strata. The apparatus includes indicating means positioned at a remote station adapted to respond to electrical signals generated by the means for sensing variations in temperature.

In U. S. Pat. No. 2,260,112 to J. K. Godbey et al. patented July 12, 1966, a temperature recording device and method is shown. The device and method provides for the measurement of the peak temperature of drilling fluid at dynamic circulating conditions during the drilling of a well. A temperature measuring means is positioned in a casing of abrasion resistant material which has at least one dimension of a size sufficient to pass through the circulating openings in a drill bit. The casing is introduced into the drilling fluid and circulated through the drill pipe, through openings in the drill bit and up through the annulus of the well to the earth's surface.

SUMMARY OF THE INVENTION

The present invention provides a system for recording the maximum temperature of a rotary rock bit during the drilling of a well. A means for recording maximum temperature is connected to a rotary rock bit and adapted to record the maximum temperature of the bit during drilling. The means for recording maximum temperature includes a container that houses temperature indicating means for providing a permanent change in indicia when subjected to a predetermined temperature. The container that houses the temperature indicating means is adapted to be easily and quickly connected to and removed from the rotary rock bit.

The above and other features and advantages of the present invention will become apparent from a consideration of the following detailed description of the invention when taken in conjunction with the accompanying drawings.

DETAILED DESCRIPTION OF THE INVENTION

Figure 1:
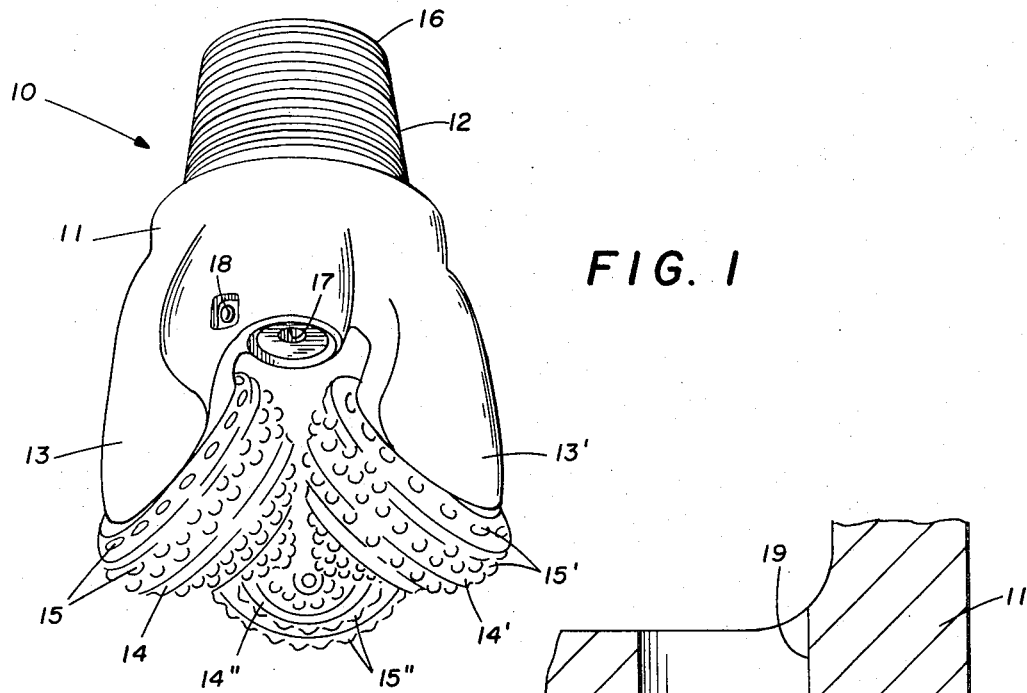
FIG. 1 is an illustration of a three cone, jet type, rotary rock bit constructed in accordance with the present invention.

Referring now to FIG. 1, a three cone, jet type, rotary rock bit is shown and generally designated by the reference number 10. The bit 10 includes a bit body 11 including an upper threaded portion 12. The threaded portion 12 allows the bit 10 to be connected to the lower end of a rotary drill string (not shown). Depending from the bit body 11 are three substantially identical arms with two of the arms 13 and 13' being shown in FIG. 1. Three rotary cone cutters 14, 14' and 14'' are rotatably positioned on three bearing pins extending from the arms. Each of the cutters 14, 14' and 14'' includes cutting structure 15, 15' and 15'' on its outer surface adapted to disintegrate the formations as the bit 10 is rotated and moved through the formations. The cutting structure 15, 15' and 15'' is shown in the form of tungsten carbide inserts; however, it is to be understood that other cutting structures such as steel teeth may be used as the cutting structure on the cone cutters.

The bit 10 includes a central passageway 16 extending along the central axis of body 11 to allow drilling fluid to enter from the upper section of the drill string (not shown) immediately above and pass downward through three jet nozzles, one nozzle 17 being shown in FIG. 1, to the bottom of the well bore. The nozzle 17 is held in place by a removable retaining member 18 that is inserted in a hole in the bit body 11.

In use, the bit 10 is connected as the lower member of a rotary drill string (not shown) and lowered into a well bore until the cone cutters 14, 14' and 14'' engage the bottom of the well bore. Upon engagement with the bottom of the well bore, the drill string is rotated, rotating bit 10 therewith. Drilling fluid is forced downward through the interior passage of the rotary drill string and the drilling fluid continues through the central passageway 16 of bit 10 passing through the nozzles 17, 17' and 17'' to the bottom of the well bore, thence, upward in the annulus between the rotary drill string and the wall of the well bore to the earth's surface.

Figure 2:
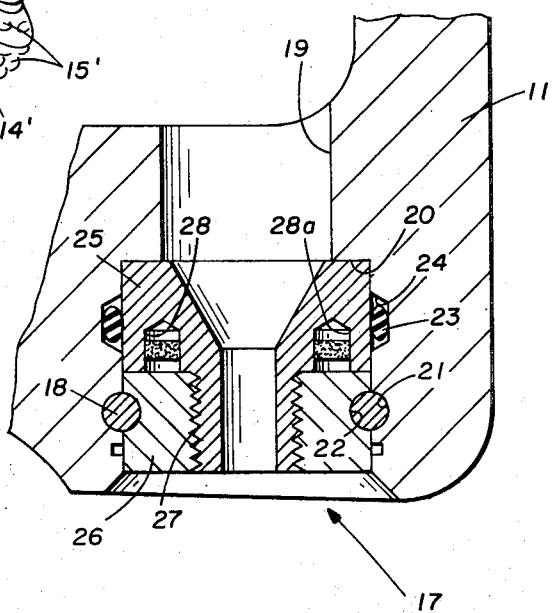
FIG. 2 is a cross section of one of the nozzles of the bit shown in FIG. 1.

Referring now to FIG. 2, the nozzle 17 is shown in greater detail. The nozzle 17 is removably mounted in a passage 19 in the bit body 11. Passage 19 is counterbored to form a shoulder 20 which faces downwardly and to which the upper end of the nozzle 17 is adjacent. The internal diameter of the counterbore is slightly larger than the outer diameter of the nozzle 17 in order that nozzle 17 may be readily slid into the counterbore, or removed, without rotation. The nozzle 17 is releasably secured within the counterbore of passage 19 by means of a peripheral groove 21 formed in the wall of the counterbore and a matching groove 22 formed in the external wall of the nozzle forming a passageway into which the retainer member 18 is forced to bridge across the grooves. By removing the retainer member 18, the nozzle 17 may be easily and quickly removed from the bit 10. A seal ring 23 is positioned in a groove 24 to insure a fluid tight seal between the bit body 11 and nozzle 17.

The nozzle 17 is divided into an upper portion 25 and a lower portion 26. The upper and lower portions are connected together by threads 27. A multiplicity of bores 28, 28A, etc. extend into the upper portion 25 of nozzle 17. When the lower portion 26 of nozzle 17 is in engagement with the threads 27 and in abutting relationship to the upper portion 25 of nozzle 17, the open ends of the multiplicity of bores 28, 28A, etc., are covered thereby forming a container for housing a multiplicity of individual temperature indicating means.

Figure 3:
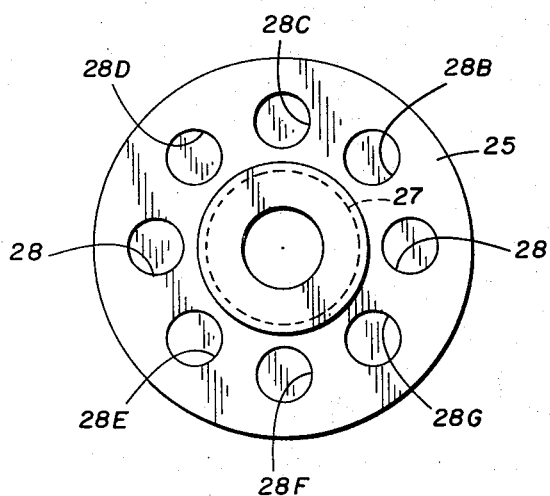
FIG. 3 is a view of the bottom of an element of the nozzle shown in FIG. 2.

Referring now to FIG. 3, a bottom view of the upper portion 25 of the nozzle 17 is shown. The multiplicity of bores 28 through 28G provide a housing for a multiplicity of individual temperature indicating means. The individual temperature indicating means are individual maximum temperature recording means for providing a permanent change in indicia when subjected to a predetermined temperature. The multiplicity of individual temperature indicating means are selected so that said predetermined temperatures form a sequence over a preselected range. This temperature range is in general with the range of from 200° to 600° Fahrenheit. The temperature measuring means may, for example, be one of the following: temperature-sensitive materials such as pellets or paints that indicate temperature by color changes; discs and rings that indicate temperature by a change in size; melt powders that indicate temperature by a change in state; and pellets, wires and cones that indicate temperature by a change in shape. Preferably, the temperature indicating means will provide a permanent change in one property after being subjected to a predetermined temperature with the change in property being capable of being visually detected.

A temperature sensitive pellet may be placed in each of the bores 28 through 28G. For example, a Tempil pellet manufactured by the Tempil Corporation of 132 West 22nd Street, New York, N.Y. 10011 may be placed in the bores in the following sequence: bore 28 — 200° pellet; bore 28A — 250° pellet; bore 28B — 300° pellet; bore 28C — 350° pellet; bore 28D — 400° pellet; bore 28E — 450° pellet; bore 28F — 500° pellet; and bore 28G — 550° pellet. The lower portion 26 of nozzle 17 is secured in place to retain the pellets. After the bit has been run, the maximum temperature encountered may be determined by a subsequent examination of the pellets.

The structural details of a system constructed in accordance with the present invention having been described, the operation of the system will now be considered with reference to FIGS. 1, 2 and 3. The lower member 26 of the nozzle 17 is removed from the upper member 25 of nozzle 17 thereby exposing the multiplicity of bores 28 through 28G. The multiplicity of individual temperature indicating means for providing a permanent change in indicia when subjected to a predetermined temperature are positioned in the bores 28 through 28G. The multiplicity of individual temperature indicating means are selected so that said predetermined temperatures form a sequence over a preselected range. The range described in connection with FIGS. 1, 2 and 3 is the range of from 200° to 550° Fahrenheit. The lower member 26 of the nozzle 17 is replaced by engaging it with the threads 27. The nozzle 17 is then inserted in the bore 19 and the retaining member 18 inserted in the grooves 21 and 22. The nozzle 17 is now locked in position in the body 11 of bit 10.

The bit 10 is connected to a rotary drill string and operated in a conventional drilling operation. After the operation of the bit is completed or when it becomes desirable to know the maximum temperature encountered during that portion of the drilling operation, the bit 10 is removed from the well bore. The retainer member 18 is removed from the bit 10 thereby releasing nozzle 17. Nozzle 17 is removed from passage 19 and the lower member 26 disconnected from upper member 25. The temperature indicating means are examined to determine the maximum temperature the bit encountered during operation. The maximum temperature encountered by the bit will be between two consecutive temperature indicating means for providing a permanent change in indicia and can be determined by detecting the first means in the sequence that did not change indicia. For example, if the maximum temperature encountered by bit 10 was 410°F during the drilling operation, the pellet in bore 28D will have changed indicia but the pellet in bore 28E will not have changed indicia. It will be appreciated that other temperature ranges may be desired and that a different selection of temperature indicating means may be employed.

The embodiments of an invention in which an exclusive property or privilege is claimed are defined as follows:

1. A system for recording the maximum temperature encountered during the drilling of a well, comprising:

a main bit body, said bit body having three individual arms extending therefrom;

a cone cutter journaled upon each of said arms;

a central passage in said bit body;

a nozzle connected to said bit body, said nozzle in communication with said central passage;

a container in said nozzle;

temperature measuring means positioned in said container for providing a permanent change in indicia when subjected to a predetermined temperature; said temperature measuring means includes a multiplicity of individual temperature indicating means for providing a permanent change in indicia when subjected to temperatures within a preselected range; and means for selectively locking said container in said nozzle, said means for selectively locking said container in said nozzle including groove means in said container, groove means in said nozzle and a retainer member that bridges both said groove means.

* * * * *